United States Patent [19]

Gyi

[11] 4,314,288
[45] Feb. 2, 1982

[54] AMPLITUDE AND PHASE EQUALIZER

[75] Inventor: Maung Gyi, San Francisco, Calif.

[73] Assignee: Ampex Corporation, Redwood City, Calif.

[21] Appl. No.: 182,352

[22] Filed: Aug. 29, 1980

[51] Int. Cl.³ .............................. G11B 5/45; G11B 5/02
[52] U.S. Cl. .......................................... 360/65; 360/67
[58] Field of Search ...................................... 360/65, 67

[56] References Cited
U.S. PATENT DOCUMENTS
4,110,798 8/1978 Miller et al. .......................... 360/65

Primary Examiner—Vincent P. Canney
Attorney, Agent, or Firm—Elizabeth E. Strnad; Joel D. Talcott

[57] ABSTRACT

Minimal realization of an optimum amplitude and phase equalizer is disclosed. A first amplifier circuit including first respective passive filter elements provides both high and low frequency amplitude equalization. A second amplifier circuit including second respective passive filter elements provides first, second or higher order phase equalization, respectively, with gain. The equalizer operates between voltage sources and virtual ground to minimize noise picked up from parasitic capacities and external sources.

18 Claims, 9 Drawing Figures

PRIOR ART

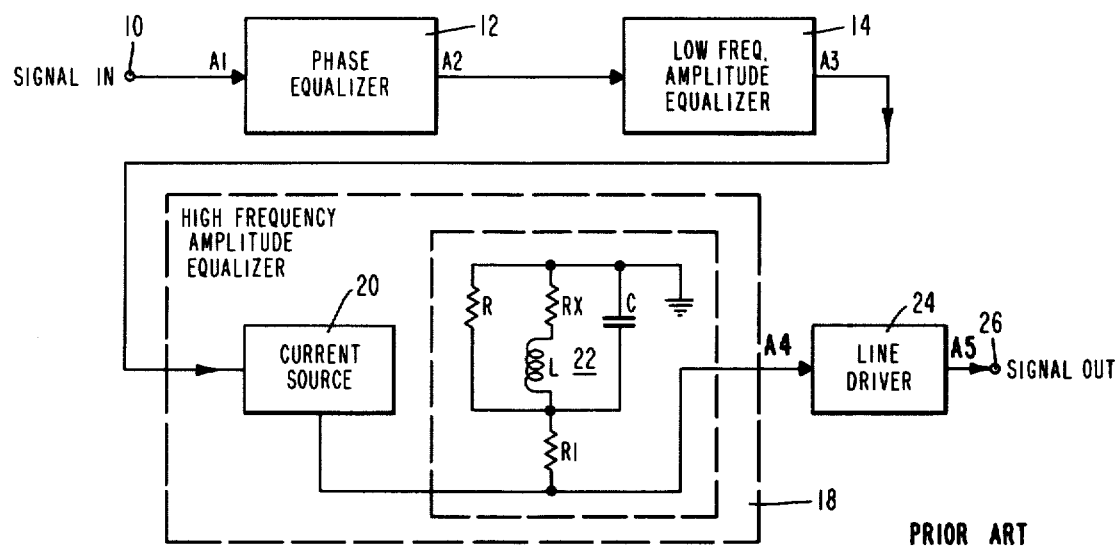
FIG_1A
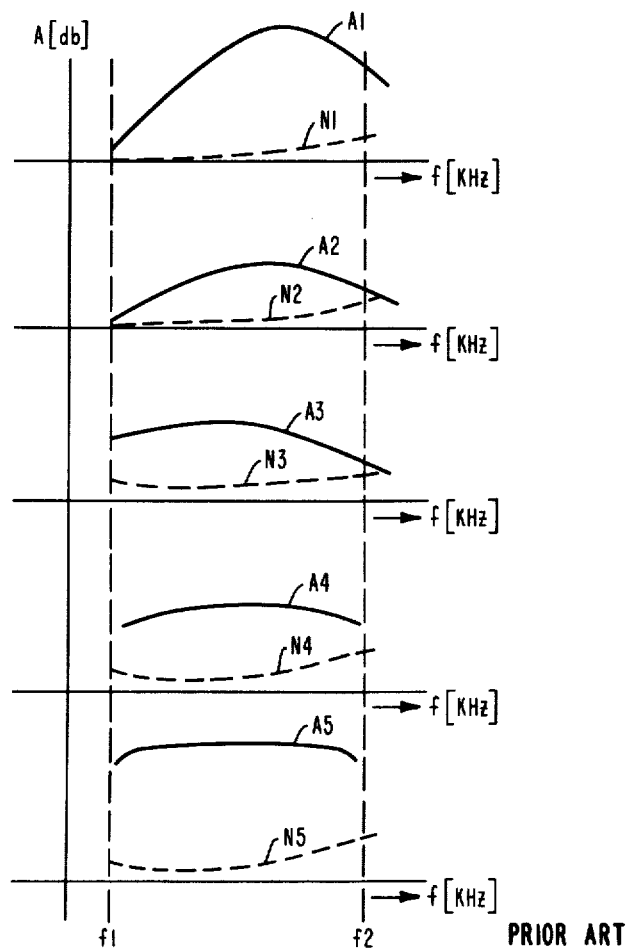
FIG_1B

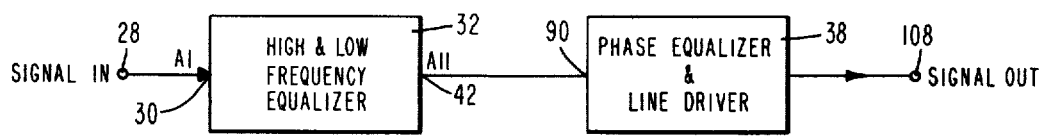
FIG_2A
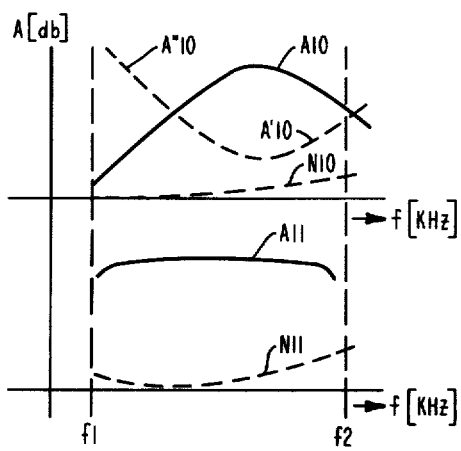
FIG_2B
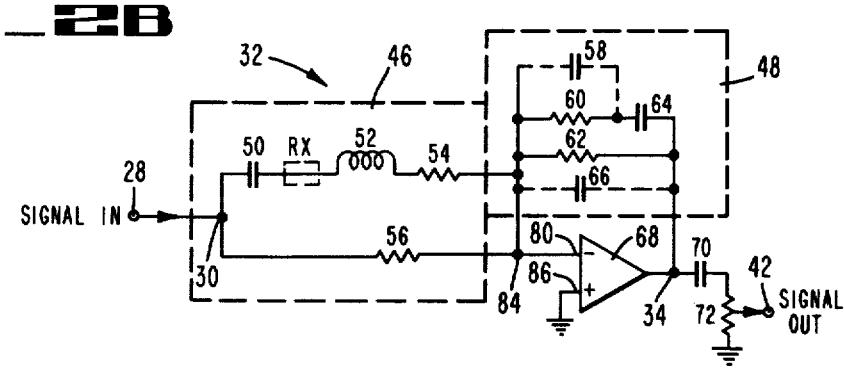
FIG_3
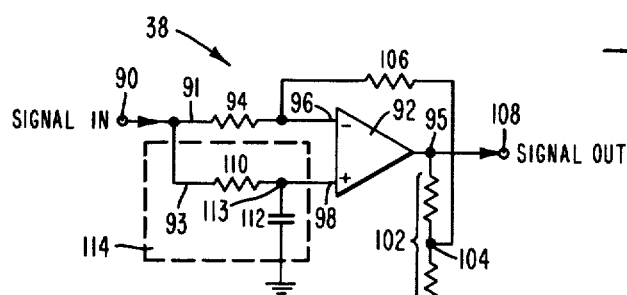
FIG_4
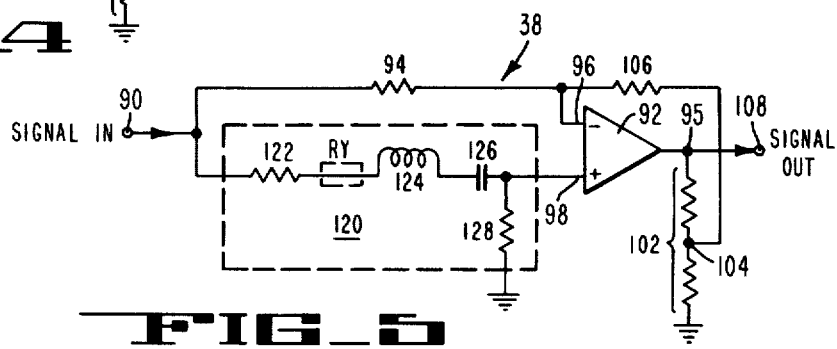
FIG_5

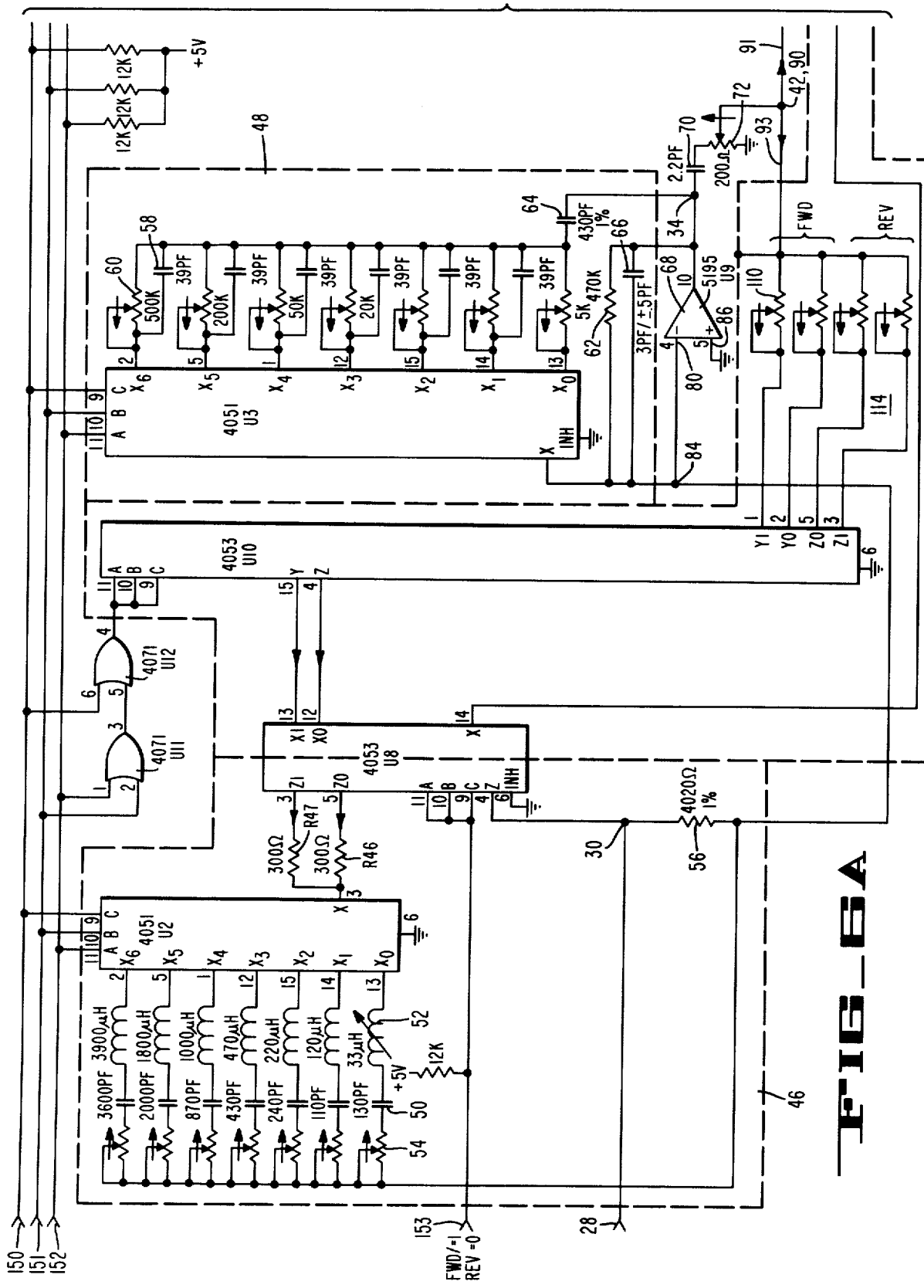

AMPLITUDE AND PHASE EQUALIZER

BACKGROUND OF THE INVENTION

The invention relates to amplitude and phase equalizers of analog or digital signals, such as useful in signal transmission or magnetic recording/reproduction and more particularly, to equalizers having a simplified circuit design and improved signal-to-noise ratio.

Prior art equalizers of signals passing through a recording or transmission channel for obtaining a desired amplitude characteristic and linear phase characteristic with frequency are susceptible to noise and signal distortion results. For example, equalizers having cascaded passive and active filter circuits whose combined frequency responses yield a desired amplitude and phase versus frequency characteristic over a known bandwidth are known to have a rather complex design including several consecutive stages, such as phase equalizer, low frequency pass, high frequency pass, line driver, etc. Each such stage comprises an active device with high impedance input and/or output circuit and therefore it is susceptible to noise. Such noise may originate from parasitic capacitance within the circuit or from an external power supply. Each consecutive stage further contributes to the noise, thus a low signal-to-noise ratio of the equalized signal results.

SUMMARY OF THE INVENTION

Accordingly, it is an object of the invention to provide an amplitude and phase equalizer for analog or digital signals, having a simplified circuit design in which the total number of active and passive devices is reduced.

It is a further object to provide an amplitude and phase equalizer having an optimum signal-to-noise ratio.

It is another object to provide an amplitude and phase equalizer having a constant time delay, that is, a phase characteristic linearly changing with frequency.

It is still a further object to provide an amplitude and phase equalizer which is immune to stray capacitances and extraneous noise pick-up.

It is another object to provide an amplitude and phase equalizer having simplified adjustment of passive components for high accuracy of equalization.

It is a further object to provide an amplitude and phase equalizer having the above-indicated features and suitable for use in single speed or multispeed magnetic recording/playback devices.

It is a further object of the invention to provide an amplitude and phase equalizer having the above-indicated features and reduced manufacturing cost.

BRIEF DESCRIPTION OF THE DRAWINGS

FIG. 1A is a block diagram of a prior art amplitude and phase equalizer.

FIG. 1B shows respective amplitude/frequency characteristics obtained in various portions of the equalizer of FIG. 1A.

FIG. 2A is a block diagram of a preferred embodiment of the amplitude and phase equalizer of the invention.

FIG. 2B shows respective amplitude/frequency characteristics obtained by the equalizer of FIG. 2A.

FIG. 3 is a circuit diagram of a preferred embodiment of an amplitude equalizer of the invention.

FIG. 4 is a circuit diagram of a preferred embodiment of a first order phase equalizer of the invention.

FIG. 5 is a circuit diagram of a preferred embodiment of a second order phase equalizer of the invention.

FIGS. 6A and 6B are consecutive parts of a detailed electrical circuit diagram showing a further embodiment of a multispeed amplitude and phase equalizer of the invention.

DETAILED DESCRIPTION

Figure 6B:
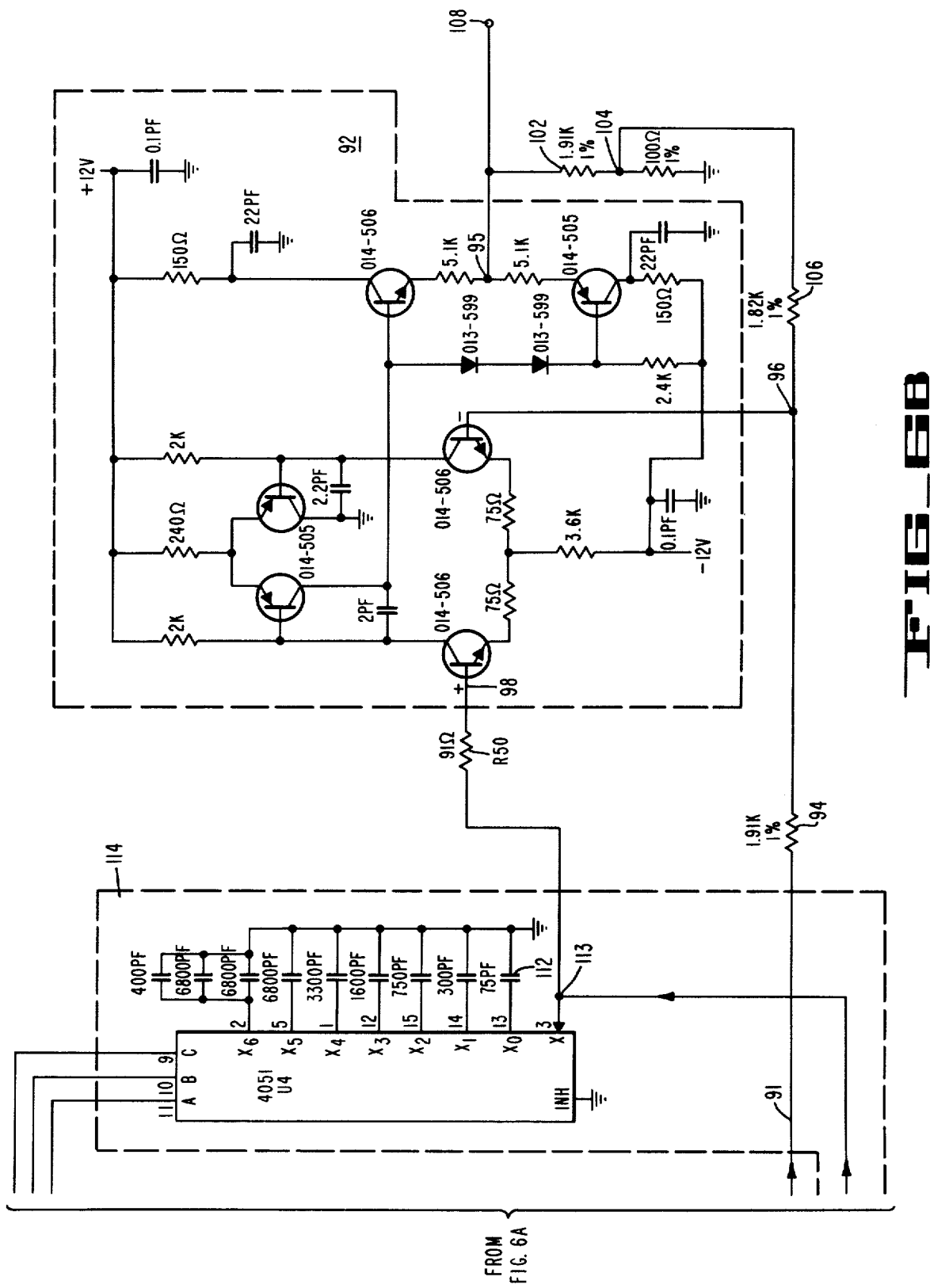

First, a prior art amplitude and phase equalizer such as utilized in a magnetic playback device will be described briefly with reference to FIGS. 1A and 1B, to facilitate understanding of the invention.

The equalizer of FIG. 1A has the following stages connected in cascade: phase equalizer 12, low frequency amplitude equalizer 14, high frequency amplitude equalizer 18 and line driver 24. Each of these stages comprises an active device such as an operational amplifier and a number of passive filter elements, as well known in the art. Phase equalizer 12 receives at input terminal 10 a playback signal to be equalized, obtained from a magnetic recording medium by a playback head and preamplifier circuit (not shown). As it is well known the amplitude of such playback signal increases with frequency at low frequencies at a 6 dB/octave rate, levels off at mid-band frequencies and decreases with frequency at high frequencies, as shown by amplitude/frequency characteristic A1 in FIG. 1B. In FIG. 1B the amplitude is plotted in dB and the frequency in kHz. Low and high frequency limits of the frequency band utilized are indicated by f1 and f2, respectively. The prior art phase equalization circuit 12 operates in a well known manner while it does not provide signal gain. Thus, the output signal therefrom has a decreased amplitude level due to losses as shown by amplitude response A2 in FIG. 1B. In FIG. 1B a typical preamplifier noise level/frequency characteristic N1 is shown, contained in the input signal received at input terminal 10, as well known in the art. The phase equalization circuit 12 has a relatively high input and output impedance, which render it susceptible to noise. Any such picked up noise is added to the existing preamplifier noise thus resulting in increased noise level/frequency characteristic as shown at N2, contained in the output signal from circuit 12.

The thusly obtained phase-equalized signal from circuit 12 is applied to a prior art low frequency amplitude equalizer 14 of FIG. 1A, which provides a decreasing amplitude characteristic with frequency at low frequencies, as well known in the art. The resulting amplitude/frequency characteristic of the signal obtained from circuit 14 is shown at A3 in FIG. 1B. Active devices in circuit 14 further contribute to pick-up and amplification of noise and consequent degradation of signal-to-noise ratio. The resulting increased noise level/frequency characteristic N3 of the noise contained in the output signal from circuit 14 is shown in FIG. 1B.

The following stage is a prior art high frequency amplitude equalizer 18 coupled to output of circuit 14. The signal from circuit 14 is in form of an output voltage, as well known. Circuit 18 transforms that voltage into current by means of a current source 20. The current source is followed by a series resistor R1 and a parallel passive resonant RLC filter circuit 22. Inductance L has an inherent parasitic series resistance RX, which cannot be compensated for within the parallel resonant filter circuit 22 to "idealize" inductance L, as well known. Circuit 18 provides an increasing amplitude characteristic with frequency at high frequencies, and consequently an amplitude equalized signal is obtained at output of circuit 18, having a desired substantially flat frequency response, as shown at A4 in FIG. 1B. The prior art high frequency amplitude equalizer 18 is a high impedance active circuit, thus sensitive to further pick-up and amplification of external and internal noise. The resulting increased noise level/frequency characteristic obtained at output from circuit 18 is shown at N4 in FIG. 1B.

Since the respective stages 12, 14, 18 do not provide sufficient gain necessary for further processing and utilization of the equalized playback signal, an additional line driver circuit 24 including an amplifier is needed in the prior art equalizer of FIG. 1A. The line driver 24 provides a necessary signal level increase within the utilized frequency band. The resulting amplitude characteristic A5 of the amplitude and phase equalized signal obtained at output 26 of line driver 24 and accompanying noise level characteristic N5 are respectively shown in FIG. 1B.

The foregoing description reveals that in prior art equalizers of the type shown in FIG. 1A including a number of active consecutive stages, each stage contributes to degradation of signal-to-noise ratio. Specifically, the signal passes through at least two active devices before any high frequency equalization is attempted, while there is a loss of gain in the phase equalizer. The respective amplifiers of the first three stages 12, 14, 18 of FIG. 1A must have large dynamic range with respect to the wide frequency band of the processed signal. With respect to complexity and related high cost of the above-described prior art equalizer is not feasible to correct time delay at low tape speeds, since large size passive components requiring complex adjustments have to be utilized. The latter disadvantage particularly applies to higher order equalizers utilizing more than one inductor and/or mutual inductors, as it is well known in the art.

As it will follow from further description, the amplitude and phase equalizer of the invention eliminates the above mentioned disadvantages of the prior art devices. FIG. 2A shows a block diagram of the preferred embodiment of the invention. The circuit of FIG. 2A has only two active stages, each comprising one operational amplifier and respective passive filter elements. A first stage 32 provides both high and low frequency amplitude equalization, while the second stage 38 provides phase equalization with gain. An input signal to be equalized, such as a playback signal of the type previously described with reference to FIG. 1A, is received at an input terminal 28. Such playback signal has a well known amplitude/frequency characteristic as shown at A10 in FIG. 2B, which characteristic is similar to the previously described characteristic A1 of FIG. 1B. Typical preamplifier noise whose amplitude/frequency characteristic is shown at N10 in FIG. 2B accompanies the playback signal. Characteristic N10 is similar to the previously described characteristic N1 of FIG. 1B. Circuit 32 provides an increased amplitude of the input signal at both high and low frequency end of the utilized frequency spectrum f1 to f2, as it will be disclosed later in more detail. The resulting desired substantially flat amplitude response of the amplitude equalized signal at output 42 of circuit 32 is shown at A11 in FIG. 2B.

The subsequent stage 38 of the equalizer of FIG. 2A utilizes an amplifier in combination with passive filter elements to provide both phase equalization and line driving operations, respectively, as it will be described in more detail below.

In the equalizer of FIG. 2A the total number of respective active and passive devices providing amplitude and phase equalization in accordance with the invention is substantially reduced. At the same time maximum gain is provided by the first stage to improve significantly the resulting signal-to-noise ratio of the amplitude and phase equalizer of the invention. These and other important features and advantages of the invention will follow from the detailed description below.

FIG. 3 shows a preferred embodiment of the amplitude equalizer corresponding to block 32 of FIG. 2A. An inverting operational amplifier 68 has an input filter 46 coupled between its inverting input 80 and an input terminal 28. A non-inverting input 86 of amplitude 68 is grounded. Input filter 46 comprises an RLC series resonant circuit including capacitor 50, inductance 52 and damping resistor 54. Filter 46 also comprises resistor 56 in parallel with the series elements 50, 52, 54.

Input filter 46 in combination with amplifier 68 operates as a high pass filter providing an increasing amplitude characteristic with frequency at the high end of the frequency band utilized, as shown at A'10 in FIG. 2B. Inductance 52 in FIG. 3 is represented by a non-ideal inductor, that is, it includes a series parasitic resistance RX, shown in phantom in FIG. 3 for illustration purposes.

It will be appreciated that in the amplitude equalizer 32 of the invention a known parasitic resistance value RX may be compensated for by reducing the actual value of series resistor 54 correspondingly. Thus the inductor 52 may be "idealized" by "absorbing" its resistive losses in the circuit design, namely by reducing the value of resistor 54 accordingly.

In the circuit 32 the input filter 46 is located between a "voltage source" represented by input terminal 28 and virtual ground represented by junction 84 at inverting input 80 of amplifier 68. Consequently, the equalizer operates in the current mode rather than in the voltage mode, thus differing in operation from prior art equalizers. As a result, in the circuit of FIG. 3 external noise pick-up is virtually eliminated and stray capacitances become uncritical even if the input leads from terminal 28 are relatively long.

A feedback filter 48 is coupled between output 34 and inverting input 80 of inverting operational amplifier 68. Amplifier 68 in combination with filter 48 operates as a low pass filter providing a decreasing amplitude characteristic with increasing frequency at the low end of the utilized frequency band, as shown at A"10 in FIG. 2B. The resulting flat low and high frequency amplitude equalized characteristic provided by filters 46 and 48, respectively, is shown at A11 in FIG. 2B. Filter 48 includes a series combination of resistor 60 and capacitor 64 in parallel with resistor 62. Parallel capacitors 58, 66 may be added to resistors 60, 62 respectively, for obtaining faster roll-off of high frequency noise. A further capacitor 70 may be coupled between the output 34 of amplifier 68 and one terminal of output potentiometer 72, if desired, to shape the low frequency amplitude response and, to define the low frequency limit f1 of equalization. The other terminal of potentiometer 72 is grounded. The sliding contact of potentiometer 72 serves to adjust a desired output signal level obtained at output terminal 42 from the amplitude equalization circuit 32.

Similarly to the above-described operation of input filter 46, the feedback filter 48 also operates between a voltage source, represented by the output voltage at 34 from amplifier 68 and between virtual ground provided at inverting input 80. By the above-described arrangement the circuit of FIG. 3 has both low impedance input and output circuits and consequently, it is immune to extraneous noise pick-up as well as to noise effected by parasitic capacitors. It is a further important advantage that resistive coil losses can be compensated for in the circuit design of the invention by the series resistor 54, as previously described. There is a further advantage that passive elements with relatively small component values can be utilized instead of large components needed in prior art amplitude equalizers, while greater and thus more precise adjustment range of the components is possible. It follows from the foregoing description that the amplitude equalizer of the invention uses only one active device for both low and high frequency equalization with gain, thus significantly reducing the number of necessary active devices when comparing to prior art amplitude equalizers. Thus, the resulting signal-to-noise ratio is greatly improved. At the same time high frequency adjustment of the amplitude equalizer of FIG. 3 may be provided by passive components of filter 46, while low frequency adjustment may be provided by passive elements of filter 48. Consequently, the respective high and low frequency adjustments of the amplitude equalizer of the invention do not interact with each other thus simplifying filter adjustment and facilitating utilization. It will be appreciated that at the same time quality of equalization is improved.

FIG. 4 shows a preferred embodiment of the phase equalizer in combination with a line driver in accordance with the invention, corresponding to block 38 of FIG. 2A. In FIG. 4 an inverting operational amplifier 92 is utilized having an input resistor 94 coupled between input terminal 90 and inverting input 96 of amplifier 92. An output 95 of amplifier 92 is coupled to one end of a voltage divider 102 whose other end is grounded. Output 104 of voltage divider 102 is coupled via feedback resistor 106 to the inverting input 96 of amplifier 92. The output 95 of operational amplifier 92 is coupled to output terminal 108 of the circuit of FIG. 4. The above-described elements of FIG. 4 represent a line driver which, as it is known in the art, increases substantially linearly the amplitude level of a signal received at input terminal 90 within a predetermined frequency band.

In accordance with the invention, a passive reactive filter 114 comprising a resistor 110 and capacitor 112 is coupled to the above-described line driver circuit to obtain phase equalization with gain. The resistor 110 is coupled between the input terminal 90 and non-inverting input 98 of the amplifier 92. The capacitor 112 is coupled between non-inverting input 98 of amplifier 92 and ground. The thusly described filter 114 in combination with the line driver provides a first order phase equalization circuit with gain. When comparing with known prior art devices it is seen that the phase equalizer of the invention is greatly simpified by utilizing only one resistor 110 and one capacitor 112 in combination with the line driver. It is an advantage of the first order phase equalizer of FIG. 4 that the phase equalizer does not require a separate active device of its own to do the necessary phase correction. The latter function is provided by the two passive components added to the line driver. Thus, the phase equalization in accordance with the invention is provided without contributing any additional noise to the system.

If a more accurate phase equalizer is necessary, that is, one which reduces the time delay distortion within the given frequency limits to a still smaller value, a second order phase equalizer may be provided in accordance with the invention, as it will be described below with reference to FIG. 5. It is seen from comparing FIGS. 4 and 5 that both circuits comprise a similar line driver including inverting operational amplifier 92, input resistor 94, output potentiometer 102 and feedback resistor 106, respectively. However, the previously described filter 114 of FIG. 4 is replaced in FIG. 5 by filter 120. Filter 120 comprises a series resonant circuit RLC, having inductor 124, capacitor 126, and damping resistor 122. The series resonant circuit 122, 124, 126 is coupled between input terminal 90 and non-inverting input 98 of operational amplifier 92. Filter 120 also comprises a resistor 128 coupled between non-inverting input 98 and ground. Filter 120 in combination with the line driver circuit of FIG. 5 provides a second order phase equalization circuit with gain. In the embodiment of FIG. 5 filter 120 operates as an all pass filter. The values of resistors 122, 128 are selected to obtain a desired peak of the delay characteristic at a precisely defined frequency, while the values of resistors 94, 102, 106 are selected to obtain a desired shape of the delay characteristic with frequency.

It will be appreciated that the filer 120 of FIG. 5 comprises a damping resistor 122 in series with inductor 124. Consequently, the inductor may be "idealized" by adjusting the resistance value of series resistor 122 to compensate for known resistive losses RY inherent to inductor 124, similarly as it has been disclosed previously with reference to filter 46 of FIG. 3.

Besides the resistors 122, 128 in the second order equalizer of FIG. 5, only one inductor 124 and one capacitor 126 is employed in combination with the line driver to obtain a desired high quality phase equalization with gain. In comparable prior art phase equalizers a number of passive reactive elements including precision capacitors and mutual inductors as well as further active elements are known to be utilized. The thusly simplified phase equalizer of the invention is especially useful in magnetic recorders/reproducers operating at low recording speeds where the passive components have large parameters and consequently large size. In prior art phase equalizers accurate phase equalization could not be achieved due to the high number, large size, high cost and complex adjustment of passive components, particularly in higher order equalizers. It follows from the foregoing that the phase equalization circuit of the invention fulfills requirements for a simplified design, high accuracy of signal reproduction and economical manufacturing. The above-described phase equalizer of the invention is particularly useful in applications where precise time delay correction of digital or analog signals passing through filter networks has to be provided, such as in signal transmission channels in general and in magnetic recorders/reproducers in particular and in other applications.

If a still higher order phase equalization is needed, it may be provided by replacing filter 120 of FIG. 5 by a selected higher order passive reactive filter. The design and component values of such higher order filters may be determined from well known equations defining corresponding transfer functions, as it is well known in the art. Thus, the number of necessary active devices does not need to be increased for higher order phase equlizers in accordance with the invention.

However, in applications where the number of active device does not need to be reduced to minimum, higher order phase equalizers of the invention may be provided alternatively by simply connecting in series a desired number of first and/or second order phase equalizers in accordance with FIGS. 4 or 5, respectively. For example, third order phase equalizer may be provided by connecting in series a first and a second order phase equalizer of the invention; a fourth order phase equalizer may be obtained by series connection of two second order equalizers, etc.

While it is preferable to utilize the amplitude and phase equalization circuit of the invention, both in combination with each other as it has been disclosed with respect to FIG. 2A, these respective circuits may also be utilized individually, depending on the nature of the particular application. For example, if phase equalization is not required, the amplitude equalization circuit of FIG. 3 may be utilized with utilizing the circuit of FIG. 4 or 5. On the other hand, if only phase equalization is needed, the circuit of FIG. 4 or 5 may be utilized respectively without using the circuit of FIG. 3. The latter use and applications are possible with respect to the particular feature of the invention that the respective amplitude and phase equalizer circuits operate independently and each circuit may be adjusted separtely for optimum performance.

The amplitude and phase equalizer of the invention whether separated from each other or combined together, may be utilized respectively in a single channel, multichannel, single speed or multispeed magnetic recording system, such as for instrumentation, audio or video applications, utilizing analog or digital signal recording techniques. Due to simplicity of the circuits in accordance with the invention, trouble shooting of the system is minimized. With respect to the reduction in size and cost of the circuits of the invention, it may become feasible to use in multispeed devices separate amplifiers and passive elements for each individual speed of associated magnetic medium. Alternatively, the multispeed equalizer of the invention may have a common amplifier for the amplitude equalizer and another one for the phase equalizer, respectively, to be utilized for a subset of speeds and each amplifier may be connected to separate sets of passive elements for each individual speed via a multiplexer.

It will be understood from the foregoing disclosure that any other desired amplitude equalization curves besides flat amplitude/frequency response may be obtained when utilizing the amplitude equalizer of the invention.

To provide a more complete disclosure of the invention, a detailed electrical circuit diagram representing one channel of a multichannel multispeed amplitude and phase equalization circuit is shown in consecutive FIGS. 6A and 6B and will now be described. The amplitude equalizer portion of the detailed diagram basically corresponds to that previously described with reference to FIG. 3, while the phase equalizer portion corresponds to the previously described circuit of FIG. 4. The preferred embodiment of FIGS. 6A and 6B is used for equalization of a digital signal played back from one channel of a multichannel seven speed tape recording device. However, the circuit of FIGS. 6A and 6B may be easily adapted for equalization of playback signals recorded in analog mode by simply changing the values of the passive components. It is noted that for disclosure purposes the respective type numbers and values of various components are included in the diagram of FIGS. 6A and 6B.

To facilitate comparison between the circuits of FIGS. 3 and 4 and FIGS. 6A and 6B, similar elements as well as circuits portions therein have been designated by like reference numerals.

With reference to FIGS. 6A and 6B, a playback signal, for example, obtained from a magnetic playback head and preamplifier (not shown), is received at input terminal 28 and is fed to input 30 of input filter 46, which is similar to that previously described with reference to FIG. 3. As it is seen from the drawing, in FIG. 6A the series elements comprising capacitor 50, inductor 52, and damping resistor 54, respectively, are duplicated for each tape speed and the resulting array of these elements is connected to a multiplexer U2. The respective damping resistors 54 are adjustable and the value of each resistor 54 is set to compensate for resistive losses of the particular inductor 52 connected in series therewith, as previously disclosed with reference to FIG. 3. Digital control signals are recieved at control inputs 150 to 152 from a speed selector (not shown), which supplies a combination of high and low digital signals corresponding to a selected speed, as it is well known in the art. These control signals are applied to control inputs A, B, C of multiplexer U2. The input signal received at terminal 28 is applied via junction 30 to Z-input of a multiplexer U8. A forward or reverse control signal is received at control input 153 and applied to control inputs A, B, C of multiplexer U8. As it is well known in the art, a digitally recorded signal may be played back from magnetic tape in forward or reverse mode, while it is desirable to utilize different equalization parameters for each such mode. However, when analog signals are recorded and played back, only forward mode is utilized.

Thus, depending on a forward or reverse operation mode selected, the input signal from Z-input of multiplexer U8 is applied via one of resistors R46 or R47 to X-input of multiplexer U2, and depending on the selected tape speed, via one set of series connected passive elements 52, 50, 54, to junction 84 at inverting input 80 of amplifier 68, corresponding to that of FIG. 3. The input signal received at 28 is also applied via resistor 56 to junction 84.

Feedback filter 48 is similar to that of FIG. 3 except that separate parallel variable resistors 60 and capacitors 58 are utilized for each speed. One common terminal of these elements is connected to junction 84 via a multiplexer U3 which receives at its control inputs A, B, C, the previously mentioned control signals obtained at terminals 150 to 152, indicating selected speed. The other common terminal of elements 58, 60 is connected via capacitor 64 to output 34 of amplifier 68 corresponding to that previously described with reference to FIG. 3. Thus, the signal obtained at output 34 of amplifier 68 is fed back via capacitor 64 and a selected set of filter elements 58, 60 corresponding to the selected speed, and also via parallel elements 62, 66 to junction 84 at inverting input 80 of amplifier 68. The non-inverting input 86 of amplifier 68 is grounded. The output signal obtained at output 34 of amplifier 68 is applied via capacitor 70 and potentiometer 72, to output terminal 42. Potentiometer 72 is utilized to control the amplifier gain in a well known manner. The thusly obtained amplitude equalized signal at terminal 42 from the amplitude equalizer of FIG. 6A is applied to the phase equalizer circuit as it will be described below with reference to FIGS. 6A and 6B.

The amplitude equalized signal obtained at terminal 42 is applied via two parallel paths. One path leads via line 91 and input resistor 94 to inverting input 96 of amplifier 92. The other path leads via line 93 to an array of four variable resistors 110, each having one terminal interconnected and the other terminal connected to a separate input of a multiplexer U10. Multiplexer U10 receives at its control inputs A, B, C control signals via OR-gates U11, U12, respectively connected to the previously mentioned control inputs 150 to 152. The latter gates are utilized to provide a logic signal of one polarity when the top tape speed is selected and of opposite polarity for all the other lower tape speeds. Depending on the output signal from the above indicated OR-gates, multiplexer U10 connects respective resistors 110 at its inputs Y0, Z0 for the selected top speed and the other resistors 110 connected to its Y1, Z1 inputs for the lower speeds to its Y and Z-output respectively, the latter outputs being connected to inputs X1 and X0 of multiplexer U8. Multiplexer U8 connects one of its inputs X0 and X1 to its X-output, depending on the control signal at its A, B, C inputs indicating forward or reverse mode. The output signal from multiplexer U8 is applied via junction 113 shown in FIG. 6B to input X of a multiplexer U4. For each selected tape speed a separate capacitor 112 of filter 114 is utilized. Each capacitor 112 has one terminal connected to a respective input of multiplexer U4 while the opposite capacitor terminals are grounded. Multiplexer U4 at its inputs A, B, C receives from control inputs 150 to 152 the previously mentioned control signals indicating selected tape speed and it responsively selects a corresponding capacitor 112.

The signal from junction 113 is further applied to the non-inverting input 98 of amplifier 92 via resistor R50. The output signal of amplifier 92 obtained at output 95 is applied to one end of a voltage-divider 102, whose other end is grounded, as it has been described previously with reference to FIG. 4. The ratio of the voltage divider 102 is set to obtain a desired amplifier gain. The output signal at 104 from voltage divider 102 is fed back via feedback resistor 106 to inverting input 96 of amplifier 92. A resulting amplitude and phase equalized playback signal from the circuit of FIGS. 6A and 6B is obtained at output terminal 108, corresponding to that of the previously described FIG. 4.

The above-described preferred embodiment of the amplitude and phase playback equalizer of FIGS. 6A and 6B is suitable for use in multichannel multispeed digital mangetic tape recording/reproducing system where digital data is recorded on parallel channels of magnetic tape, and reproduced therefrom. While in FIGS. 6A and 6B a playback equalization circuit of only one channel is shown, the other channels have similar separate equalization circuits each. In the particular equalizer of FIGS. 6A and 6B the following tape speeds can be selected: 120 ips; 60 ips; 30 ips; 15 ips; 7½ ips; 3¾ ips, and 1⅞ ips.

The above-described equalization circuit of the invention is particularly useful in multichannel multispeed high density digital recording devices where it is desirable to obtain optimum amplitude and phase equalization at mimimum cost. The latter is achieved by providing both low and high frequency amplitude equalization utilizing only one active device and by providing phase equalization with gain utilizing just one additional active device. Reduction of necessary active devices to two, providing maximum gain in the first stage, as well as operation in current mode rather than voltage mode as previously described, respectively, result in simplified equalizer design and greatly improved signal-to-noise ratio. By "idealizing" the respective inductors utilized in the amplitude equalizer or second order phase equalizer, respectively, a better quality of amplitude and phase equalization is obtained, with significantly improved time delay characteristics.

While the present invention is useful for equalization in single speed magnetic recording systems on tape, disk, etc., it has particular advantage in multispeed systems since separate passive filter elements connected to common active devices may be employed for each speed. The latter feature results from minimizing the number of passive elements while decreasing their respective parameters and size are thus reducing the total cost.

While preferred embodiments of the equalizer of the invention have been described for use in a digital tape recording/reproducing system, the invention is useful for equalization of both digital and analog signals with respect to tape, disk or other suitable magnetic medium, as well as for signal transmission in general, and in similar applications.

Various modifications of the disclosed embodiments as well as alternative embodiments may become apparent to those skilled in the art without departing from the scope and spirit of the invention as defined by the appended claims.

This I claim:

1. An amplitude and phase equalization circuit, comprising in combination:
   an input terminal for receiving an input signal to be amplitude and phase equalized within a given frequency band;
   a first amplifier means having an inverting input, a non-inverting input coupled to ground, and an output for providing an amplitude equalized output signal;
   a first passive filter means coupled between said input terminal and said inverting input of said first amplifier means to provide an increasing amplitude characteristic with frequency at said output of the first amplifier means within a known high frequency portion of said given frequency band;
   a second passive filter means coupled between said output and inverting input of said first amplifier means to provide a decreasing amplitude characteristic with frequency at said output of the first amplifier means within a known low frequency portion of said given frequency band, said amplitude equalized output signal obtained at said output of the first amplifier means having a non-linear phase characteristic with frequency within said given frequency band;
   a second amplifier means having an inverting and a non-inverting input, respectively, and an output, an input impedance coupled between said output of said first amplifier means and said inverting input of the second amplifier means, a feedback impedance coupled between said output of the second amplifier means and its inverting input; and
   a third passive filter means of a selected order coupled between said output of the first amplifier means, said non-inverting input of the second amplifier means and ground, respectively, to provide at said output of the second amplifier means an amplitude and phase equalized output signal having a substantially linearly increased amplitude with respect to said output signal of said first amplifier means and having a substantially linear phase characteristic with frequency within said given frequency band.

2. The amplitude and phase equalization circuit of claim 1, wherein:
said first passive filter means comprises a first series combination of a capacitor, inductor and resistor, said first series combination being coupled in parallel with first resistor; and
said second passive filter means comprises a second series combination of a resistor and a capacitor, said second series combination being connected in parallel with a second resistor.

3. The amplitude and phase equalization circuit of claim 2 wherein said inductor of said first series combination has resistive losses of a known value and wherein the resistance value of said resistor of said first series combination is decreased by that known value to compensate for said resistive losses.

4. The amplitude and phase equalization circuit of claim 2 further comprising a first capacitor connected in parallel with said resistor of said second series combination and a second capacitor connected in parallel with said second resistor.

5. The amplitude and phase equalization circuit of claim 2 or 3, wherein said third passive filter means comprises a third resistor coupled between said output of the first amplifier means and said non-inverting input of the second amplifier means and a third capacitor coupled between said non-inverting input of the second amplifier means and ground.

6. The amplitude and phase equalization circuit of claim 2 or 3, wherein said third passive filter means comprises a third series combination of an inductor, resistor and capacitor, said third series combination being coupled between said output of the first amplifier means and said non-inverting input of the second amplifier means, said third passive filter means further comprising a fourth resistor coupled between said non-inverting input of the second amplifier means and ground.

7. The amplitude and phase equalization circuit of claim 6, wherein said inductor of said third series combination has resistive losses of a known value and wherein the resistance value of said resistor of said third series combination is adjusted to compensate for said resistive losses.

8. The amplitude and phase equalization circuit of claim 1 for use in magnetic recording/playback devices having a plurality of selectable magnetic medium speeds, wherein;
said first and second passive filter means each comprises a plurality of reactive and resistive elements, respectively, selectively connectable to said first amplifier means and wherein a said third passive filter means comprises a plurality of reactive and resistive elements selectively connectable to said second amplifier means; and
means for respectively connecting selected ones of said plurality of reactive and resistive elements of said first, second and third passive filter means to said first and second amplifier means, respectively, in response to a selected magnetic medium speed.

9. The amplitude and phase equalization circuit of claim 8, wherein,
said first passive filter means comprises a plurality of selectively connectable first series combinations, each comprising a capacitor, inductor and resistor, said plurality of first series combinations being connected in parallel with a first resistor;
said second passive filter means comprises a plurality of selectively connectable second series combinations, each comprising a plurality of selectively connectable resistors and a capacitor said second series combinations being connected in parallel with a second resistor; and
said third passive filter means comprises a plurality of third resistors selectively connectable between said output of the first amplifier means and said non-inverting input of said second amplifier means and a plurality of third capacitors selectively connectable between said non-inverting input of said second amplifier means and ground.

10. The amplitude and phase equalization circuit of claim 9 wherein said inductors of said plurality of first series combinations have respective resistive losses of known values and wherein the respective resistance values of said resistors of said first series combinations are respectively decreased by those known values to compensate for said resistive losses.

11. The amplitude and phase equalization circuit of claim 10 further comprising:
a plurality of first capacitors, each capacitor connected in parallel with one of said plurality of selectively connectable resistors of said second series combinations; and
a second capacitor connected in parallel with said second resistor.

12. An amplitude equalization circuit comprising in combination:
an input terminal for receiving an input signal to be amplitude equalized within a given frequency band;
an operational amplifier means having an inverting input, a non-inverting input coupled to ground and an output for providing an amplitude equalized output signal;
a first passive filter means having an input coupled to said input terminal and having an output coupled to said inverting input of said operational amplifier means, said first passive filter means comprises a first series combination of a capacitor, inductor and resistor, said first series combination being coupled in parallel with a first resistor; and
a second passive filter means coupled between said inverting input and output of said amplifier means, said second passive filter means comprises a second series combination of a resistor and capacitor, said second series combination being coupled in parallel with a second resistor.

13. The amplitude equalization circuit of claim 12, wherein said inductor of said first series combination has resistive losses of a known value and wherein the resistance value of said resistor of said first series combination is decreased by that known value to compensate for said resistive losses.

14. The amplitude equalization circuit of claim 12, further comprising a first capacitor connected in parallel with said resistor of said second series combination and a second capacitor connected in parallel with said second resistor.

15. A phase equalization circuit comprising in combination:
- an input terminal for receiving an input signal having a non-linear phase characteristic with frequency within a given frequency band;
- an operational amplifier means having an inverting and a non-inverting input, respectively, and an output, an input impedance coupled between said input terminal and said inverting input of said amplifier means, and a feedback impedance coupled between said inverting input and said output of said amplifier means; and
- a passive reactive filter means of a selected order coupled between said input terminal, said non-inverting input of said amplifier means and ground, respectively, to provide at said output of said amplifier means a phase equalized output signal having a substantially linearly increased amplitude with respect to said input signal and having a substantially linear phase characteristic with frequency within said given frequency band.

16. A phase equalization circuit comprising in combination:
- an input terminal (90) for receiving an input signal having a non-linear phase characteristic with frequency within a given frequency band;
- an operational amplifier means (92) having an inverting (96) and a non-inverting input (98), respectively, and an output (95), an input impedance (94) coupled between said input terminal (90) and said inverting input (96) of said amplifier means (92), and a feedback impedance (106) coupled between said inverting input (96) and said output (95) of said amplifier means (92); and
- a passive reactive filter means (114) comprising a resistor (110) coupled between said input terminal (90) and said non-inverting input (98) of said amplifier means (92) and a capacitor (112) coupled between said non-inverting input (98) and ground, respectively, for providing a first order phase equalization circuit with gain.

17. A phase equalization circuit comprising in combination:
- an input terminal (90) for receiving an input signal having a non-linear phase characteristic with frequency within a given frequency band;
- an operational amplifier means (92) having an inverting (96) and a non-inverting input (98), respectively, and an output (95), an input impedance (94) coupled between said input terminal (90) and said inverting input (96) of said amplifier means (92), and a feedback impedance (106) coupled between said inverting input (96) and said output (95) of said amplifier means (92); and
- a passive reactive filter means (120) comprising a series combination of a first resistor (122), an inductor (124) and a capacitor (126), coupled between said input terminal (90) and said non-inverting input (98) of said amplifier means (92), and a second resistor (128) coupled between said non-inverting input (98) and ground, respectively, for providing a second order phase equalization circuit with gain.

18. The phase equalization circuit of claim 17, wherein said inductor (124) has resistive losses of a known value (RY) and wherein the resistance value of said first resistor (122) is adjusted to compensate for said resistive losses.

* * * * *